(No Model.)
C. DIHLMANN.
METHOD OF REGULATING THE TENSION OF THE ELECTRIC CURRENT.
No. 417,668. Patented Dec. 17, 1889.
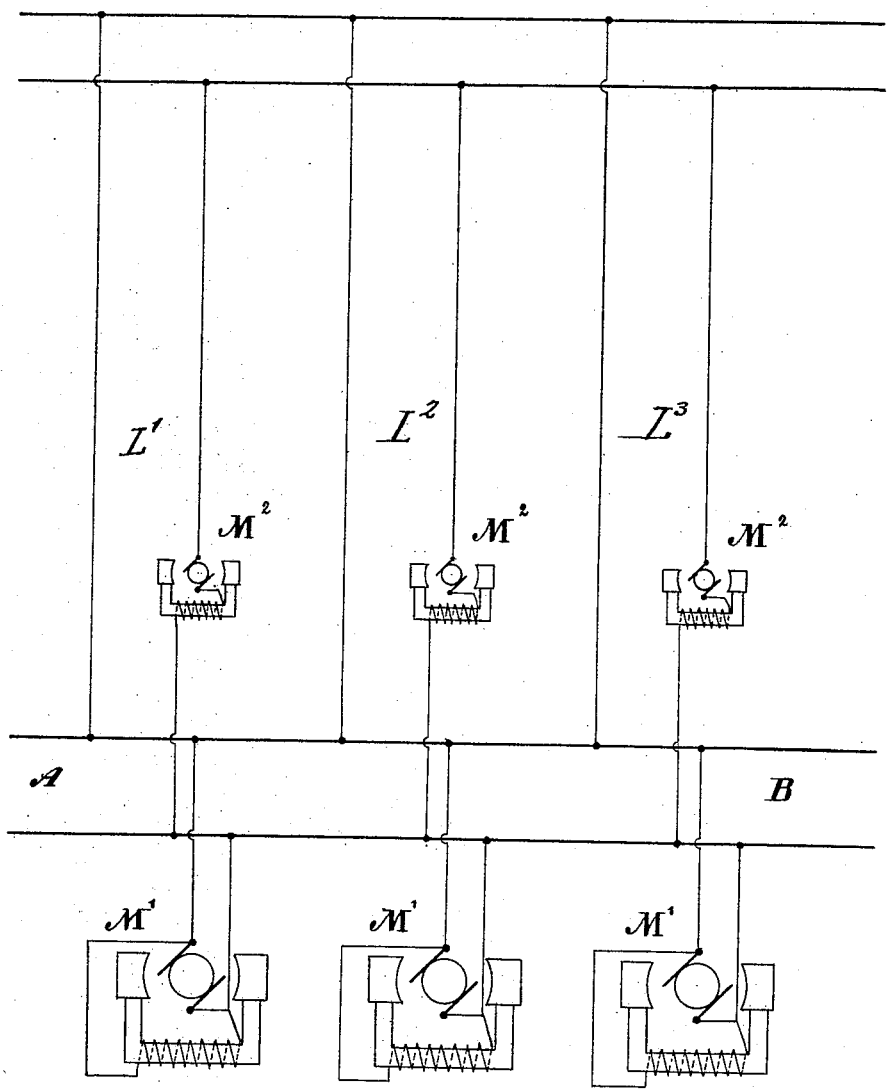

ized">UNITED STATES PATENT OFFICE.

CARL DIHLMANN, OF BERLIN, GERMANY, ASSIGNOR TO SIEMENS & HALSKE, OF SAME PLACE.

METHOD OF REGULATING THE TENSION OF THE ELECTRIC CURRENT.

SPECIFICATION forming part of Letters Patent No. 417,668, dated December 17, 1889.

Application filed April 5, 1889. Serial No. 306,053. (No model.)

*To all whom it may concern:*

Be it known that I, CARL DIHLMANN, engineer, a subject of the King of Würtemberg, residing at Berlin, in the Kingdom of Prussia, German Empire, have invented certain new and useful Improvements in the Method for Regulating the Tension of the Electric Current in Central Installations for the Distribution of the Same; and I do hereby declare the following to be a full, clear, and exact description of the invention, such as will enable others skilled in the art to which it appertains to make and use the same.

In designing electric central installations in which very strong currents are produced at one point by a number of dynamo-machines put in parallel circuit and led off from these machines through main conduits to the places of consumption (which in their turn again may be connected one with the other by means of distributing-conduits) it is a rule to allow a considerable percentage of electric energy to be lost in order to prevent the copper wires of the main conduits from being too thick in section. The loss in question is estimated in general by the maximum strength of the current passing through a main conduit, and is set down as equally great in all main conduits, so that when the strength of the current is greatest in the conduits and the tension at the machines is equal to $E_1$ then the tension at all points of consumption will be $E_1 - e = E$, in which formula $e$ is representing the loss in the conduits expressed in volts. Should, however, weaker currents pass through some or all of the main conduits, the loss in the latter will be less in proportion, and the tension at the different points of consumption will show various values—higher or lower ones, as the case may be. The weaker the currents are in the main conduits in proportion to the greatest strength of the current originally set down the higher the above values will be at the points of consumption. In order to obtain a uniform tension $E$ at the points of consumption, regulating-resistances can be fitted into the main conduit in the well-known way, so that the loss of tension in the main conduit, together with the artificial resistance, is equal to $e$.

The same aim may be attained by the following improvement, forming my present invention, which is also illustrated in the accompanying drawing. In this latter M' indicates the machines that actually produce the current, and which I will call "main machines" herein. There are in general shunt-dynamos, are all put parallel in circuit, and their separate currents unite in the conduits A B, from whence they branch off into the different main conduits L' L². The machines are now made to work at such a speed that they all indicate the same tension; for which I prefer the tension which is to be found at the points of consumption—namely, E. Besides that, I put in each of the main conduits, as soon as it has been derived from the common conduit A B, a special little dynamo-machine M², which I term an "equalizing-machine," whose armature and field-magnet coils are put in series to each other and to such main conduit. I have therefore in this case machines put in series, and it is well known that the electro-motive power is then equal to the total sum of the electro-motive power of the different machines. If I then give the equalizing-machine such a rate of speed that its electro-motive power equals to $e$—that is, to the loss of tension in the conduit when the machine is at its greatest speed—I obtain thereby in the central station a total tension of $E + e = E_1$, and at the points of consumption a tension $E_1 - e = E$, as desired.

If the consumption of electricity happens to diminish in one of the main conduits, the electro-motive power of the equalizing-machine will become less in the same measure, for when the machines are running at a uniform rate of speed the electro-motive power is dependent only on the strength of the current passing through the coils and decreases in proportion with the current. Let us say that the consumption declines by half. Then the electro-motive power of the secondary apparatus must equal to $\frac{e}{2}$, and the tension in the engines of the central station must consequently equal to $E+\frac{e}{2}$; but the loss in the main conduit likewise decreases in proportion with the current, and when the consumption decreases by one-half the former also equals to $\frac{e}{2}$, and thus I attain again a tension at the points of consumption of $E+\frac{e}{2}-\frac{e}{2}=E$, as is desired.

By means of the improvement just described the tension at the points of consumption is rendered constant in a perfectly automatic way. This method is superior to that of inserting resistances in the conduits, inasmuch as the electric energy need not be produced and destroyed again immediately after its production. In addition to that, the equalizing-machines produce part of the entire energy that has to be developed, whereby the main machines are relieved—that is to say, the number can be reduced in proportion with that part of the energy produced by the equalizing-machines. It is therefore merely the higher prices of the equalizing-machines per volt ampère that can occasion greater expense, for the complicated and expensive resistances can be entirely dispensed with then.

Having now described my invention and also the manner how and the means with which the same is to be performed, what I claim, and desire to secure by Letters Patent of the United States, is—

The hereinbefore-described method of regulating the tension of the electric current at points of consumption, which consists in causing the current to be regulated to pass through a constantly-driven armature of a dynamo-electric machine, the strength of the magnetic field of which is dependent upon the strength of the main current to be regulated, whereby any change in the electro-motive force of the current causes a corresponding change in the strength of the magnetic field of the dynamo-electric machine and a change in the tension of the current generated by the armature thereof, which, added to the tension of the current to be regulated, restores the latter to its normal electro-motive force, as and for the purposes described.

In testimony whereof I affix my signature in presence of two witnesses.

CARL DIHLMANN.

Witnesses:
GEO. H. MURPHY,
MAX HAGNER.